United States Patent
Jung (10) Patent No.: US 10,168,565 B2
(45) Date of Patent: Jan. 1, 2019

(54) IN-CELL TOUCH DISPLAY DEVICE

(71) Applicant: LG Display Co., Ltd., Seoul (KR)

(72) Inventor: Yeoun-Jei Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/019,241

(22) Filed: Jun. 26, 2018

(65) Prior Publication Data
US 2018/0307087 A1    Oct. 25, 2018

Related U.S. Application Data

(63) Continuation of application No. 15/276,659, filed on Sep. 26, 2016, now Pat. No. 10,031,359.

(30) Foreign Application Priority Data

Sep. 30, 2015 (KR) .................. 10-2015-0138060

(51) Int. Cl.
| | |
|---|---|
| *G02F 1/1333* | (2006.01) |
| *G02F 1/1339* | (2006.01) |
| *G02F 1/1343* | (2006.01) |
| *G02F 1/1362* | (2006.01) |
| *G06F 3/044* | (2006.01) |

(Continued)

(52) U.S. Cl.
CPC ...... *G02F 1/133308* (2013.01); *G02F 1/1339* (2013.01); *G02F 1/13338* (2013.01); *G02F 1/133345* (2013.01); *G02F 1/134309* (2013.01); *G02F 1/136286* (2013.01); *G06F 3/044* (2013.01); *G06F 3/047* (2013.01); *G06F 3/0412* (2013.01); *G06F 3/0416* (2013.01); *G02F 1/1368* (2013.01); *G02F 1/133514* (2013.01); *G02F 2001/133331* (2013.01);

(Continued)

(58) Field of Classification Search
CPC ............ G02F 1/133308; G02F 1/1339; G02F 1/136286; G02F 1/134309; G02F 1/133345; G02F 1/13338; G02F 2001/133331; G02F 1/133514; G02F 1/1368; G06F 3/044; G06F 3/0416; G06F 3/0412; G06F 3/047

See application file for complete search history.

(56) References Cited

U.S. PATENT DOCUMENTS

| | | | |
|---|---|---|---|
| 8,279,201 B2 | 10/2012 | Chen et al. | |
| 8,279,361 B2 | 10/2012 | Chen et al. | |

(Continued)

OTHER PUBLICATIONS

United States Office Action, U.S. Appl. No. 15/276,659, dated Nov. 16, 2017, 12 pages.

*Primary Examiner* — Tracie Y Green
(74) *Attorney, Agent, or Firm* — Fenwick & West LLP (57) ABSTRACT

A touch display device capable of reducing the width of a bezel area and achieving a slim device while arranging touch type button keys in the bezel area. The touch display device may be an in-cell touch display device that include at least one touch electrode located on a cover glass, corresponding to one or more touch key areas separated at intervals in a bezel area, extended to a display area and overlapping with a common electrode neighboring the touch key area from among the plurality of common electrodes. Accordingly, when a touch key area is touched, the voltage of a common electrode overlapping the touch electrode changes to sense whether the touch key area is touched, and thus there may not be a need to provide an additional touch panel and an additional touch driving circuit to the bezel area.

9 Claims, 10 Drawing Sheets

(51) Int. Cl.
   *G06F 3/047*    (2006.01)
   *G06F 3/041*    (2006.01)
   G02F 1/1368    (2006.01)
   G02F 1/1335    (2006.01)

(52) U.S. Cl.
   CPC .. *G02F 2201/121* (2013.01); *G02F 2201/123* (2013.01); *G02F 2203/04* (2013.01); *G06F 2203/04103* (2013.01)

(56) References Cited

U.S. PATENT DOCUMENTS

| | | |
|---|---|---|
| 8,487,892 B2 | 7/2013 | Kang et al. |
| 8,624,856 B2 | 1/2014 | Kim et al. |
| 8,803,815 B2 | 8/2014 | Wijaya et al. |
| 2011/0115733 A1 | 5/2011 | Shih |
| 2013/0082961 A1 | 4/2013 | Wang et al. |
| 2014/0054156 A1 | 2/2014 | Chang et al. |
| 2016/0291751 A1 | 10/2016 | Ma et al. |
| 2017/0185200 A1 | 6/2017 | Dai et al. |

FIG. 10

IN-CELL TOUCH DISPLAY DEVICE

CROSS REFERENCE TO RELATED APPLICATIONS

This application is a continuation of U.S. patent application Ser. No. 15/276,659 filed on Sep. 26, 2016, which claims the benefit of Korean Patent Application No. 10-2015-0138060, filed on Sep. 30, 2015, which are hereby incorporated by reference as if fully set forth herein.

BACKGROUND

Field

The present disclosure relates to a touch sensitive display device for sensing touch using a common electrode of a display panel.

Discussion of the Related Art

With the advent of the information age, display technology for visually displaying electrical information signals is under rapid development. Accordingly, efforts to decrease the volume, weight and power consumption of flat display devices have been made.

Typical examples of such flat display devices may include a liquid crystal display (LCD), a plasma display panel (PDP), a field emission display (FED), an electroluminescence display (ELD), an electrowetting display (EWD), an organic light emitting diode (OLED) display and the like.

In display devices, such as mobile devices and TVs, constructed using such flat display devices, an input interface for selecting an object or a region displayed on a display screen may be implemented in a touch manner. To this end, a display device may have a structure in which a separate touch panel is attached to a display panel, a structure in which separate touch electrodes are disposed within the display panel or a structure in which one component of the display panel is used as a touch electrode (in-cell touch).

A flat display device includes a display area in which images are displayed and a bezel area surrounding the display area. The flat display device generally includes button keys located in the bezel area. The button keys are used to receive device control input of a user.

Such button keys are implemented in a clicking manner that respond to physical pressure. In this case, there is a limit to how much the width of the bezel area can be decreased and thus it is difficult to achieve a slim device.

Alternatively, button keys are implemented in a touch manner using a separate touch panel provided to the bezel area and a touch driving circuit for driving the touch panel. Even in this case, there is a limit to how much the width of the bezel area can be decreased and thus it is difficult to achieve a slim device.

Alternatively, part of the display area may be designated as button keys for receiving device control input of the user. In this case, however, the width of an effective area for actually displaying images in the display area is reduced and usefulness of the bezel area decreases.

SUMMARY

An object of the present disclosure is to provide an in-cell touch display device capable of reducing the width of a bezel area and achieving a slim device while arranging touch type button keys in the bezel area.

To accomplish the object, an embodiment the present disclosure provides an in-cell touch display device including at least one touch electrode located on a cover glass, corresponding to one or more touch key areas separated at intervals in a bezel area, extended to a display area and overlapping with a common electrode neighboring the touch key area from among the plurality of common electrodes.

Specifically, the present disclosure provides an in-cell touch display device including: a display panel including first and second substrates attached to each other and opposite each other, gate lines and data lines located on the first substrate and intersecting to define a plurality of pixel regions in a display area, a plurality of common electrodes each corresponding to two or more neighboring pixel regions, and a plurality of sensing lines connected to the common electrodes; a cover glass located on the display panel; and at least one touch electrode located on the cover glass, corresponding to one or more touch key areas separated at intervals in a bezel area surrounding the display area, extended to the display area and overlapping with a common electrode neighboring the touch key area from among the plurality of common electrodes.

The in-cell touch display device according to an embodiment of the present disclosure includes at least one touch electrode corresponding to at least one touch key area located in the bezel area. Each touch electrode is extended to the display area and overlaps a common electrode neighboring the bezel area from among the plurality of common electrodes located in the display area.

Accordingly, when the touch key area is touched, the voltage of the common electrode overlapping with the touch electrode changes to sense whether the touch key area is touched.

As described above, the bezel area does not include an additional touch panel and an additional touch driving circuit for the touch key area although the touch key area is located in the bezel area. Accordingly, the width of the bezel area can be decreased and a slim display device can be achieved.

In one embodiment, a touch display device is disclosed. The touch display device comprises a display panel having a plurality of common electrodes connected to sensing lines and provided with a common voltage via the sensing lines. Each common electrode corresponds to a respective plurality of pixel regions in a display area. The touch display device also comprises a touch electrode corresponding to a touch key area in a bezel area surrounding the display area. The touch electrode extends into the display area and overlaps with a common electrode of the common electrodes.

DETAILED DESCRIPTION

In the specification, it will be understood that, when an element is referred to as being "on" another element, it can be directly on the other element or intervening elements may be present therebetween.

Furthermore, the use of the ordinal numbers "first", "second", "third", etc., to describe an element merely indicates that different instances of like elements are being referred to, and are not intended to imply that the elements so described must be in a given sequence.

An in-cell touch display device according to an embodiment of the present disclosure will be described in detail with reference to the attached drawings.

Figure 1:
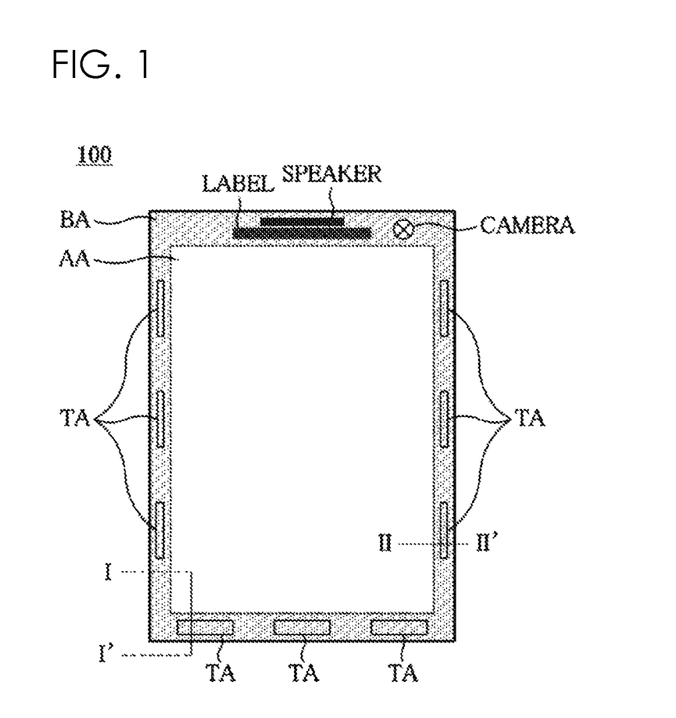
FIG. 1 is a plan view of an in-cell touch device according to an embodiment of the present disclosure.
Figure 2:
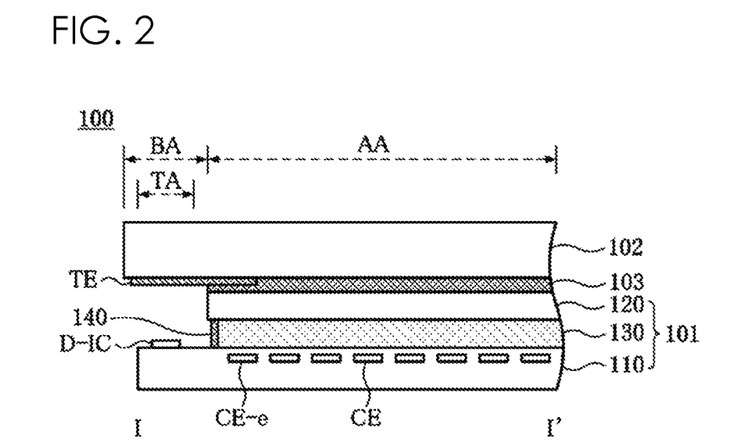
FIG. 2 is a cross-sectional view taken along line I-I' of FIG. 1.
Figure 3:
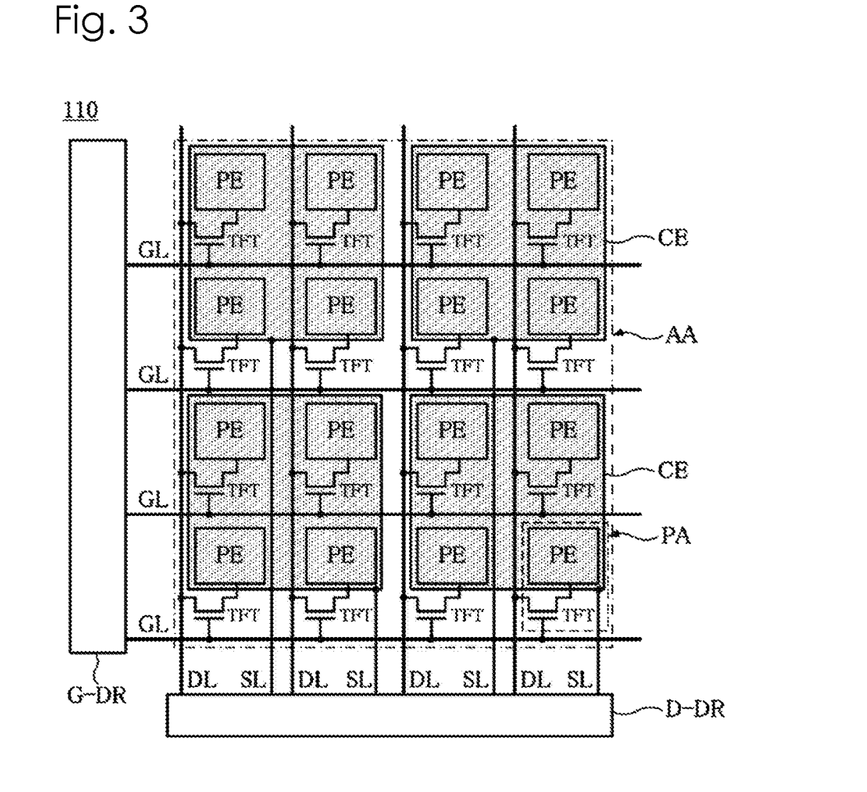
FIG. 3 is a plan view showing part of a first substrate of FIG. 2.
Figure 4A:
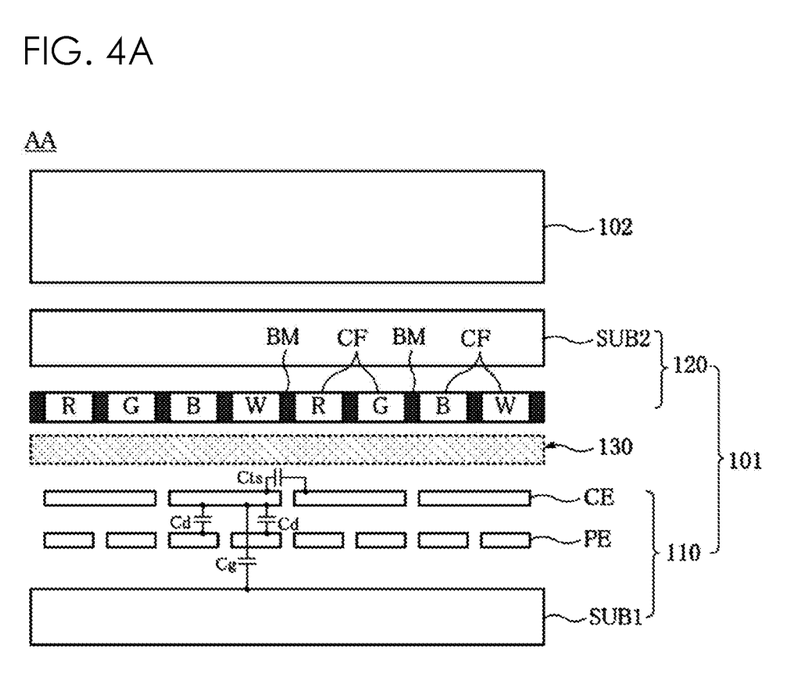
FIG. 4a is a diagram illustrating a case in which touch is not applied to part of a display area of FIG. 2.
Figure 4B:
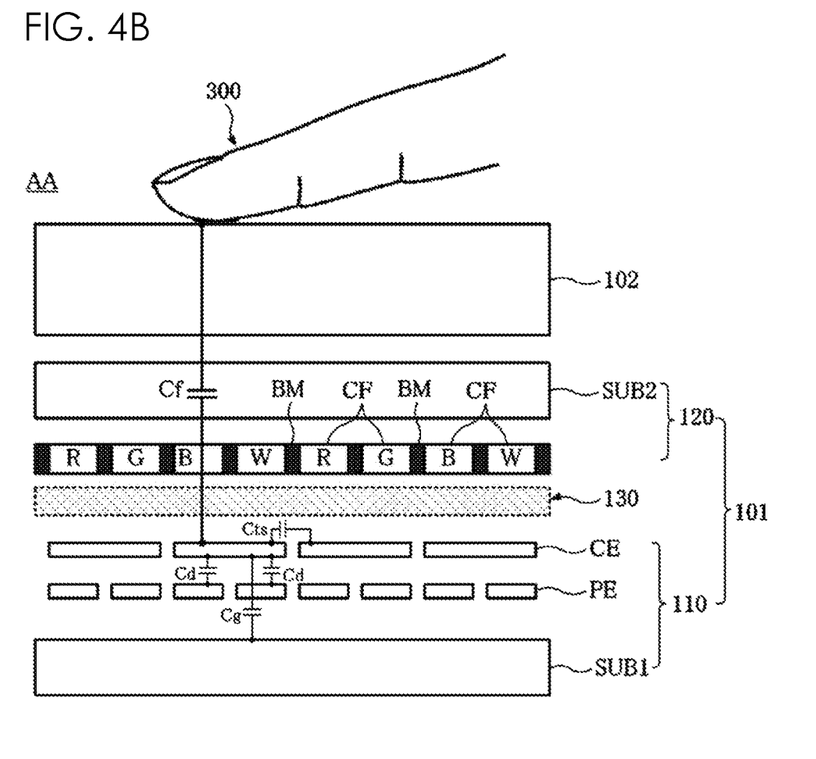
FIG. 4b is a diagram illustrating a case in which touch is applied to part of the display area of FIG. 2.
Figure 5A:
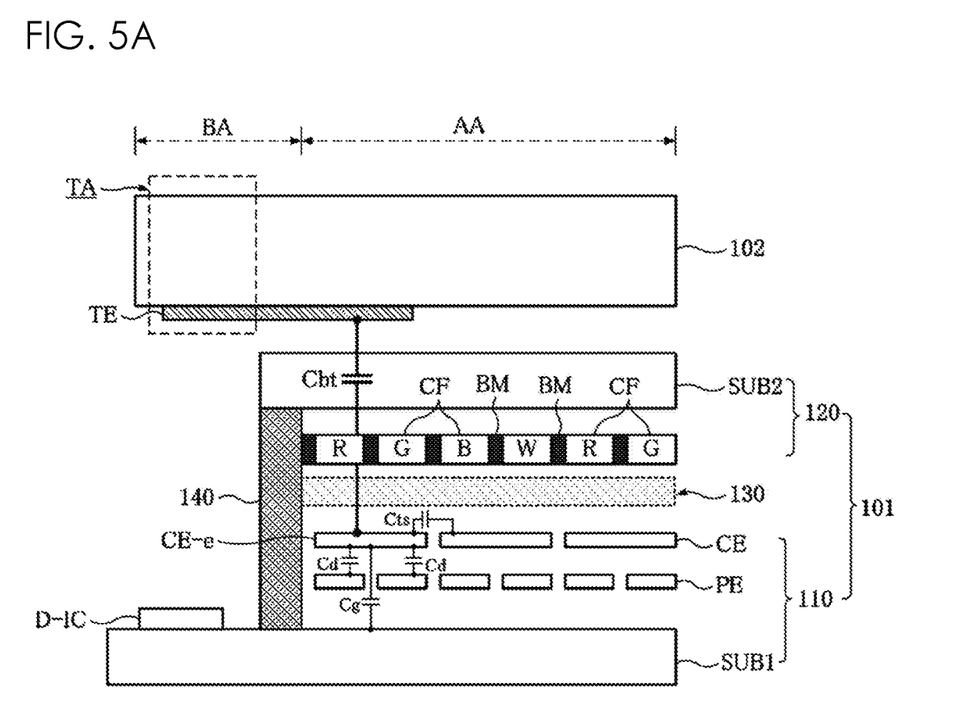
FIG. 5a is a diagram illustrating a case in which touch is not applied to a touch key area in a bezel area of FIG. 2.
Figure 5B:
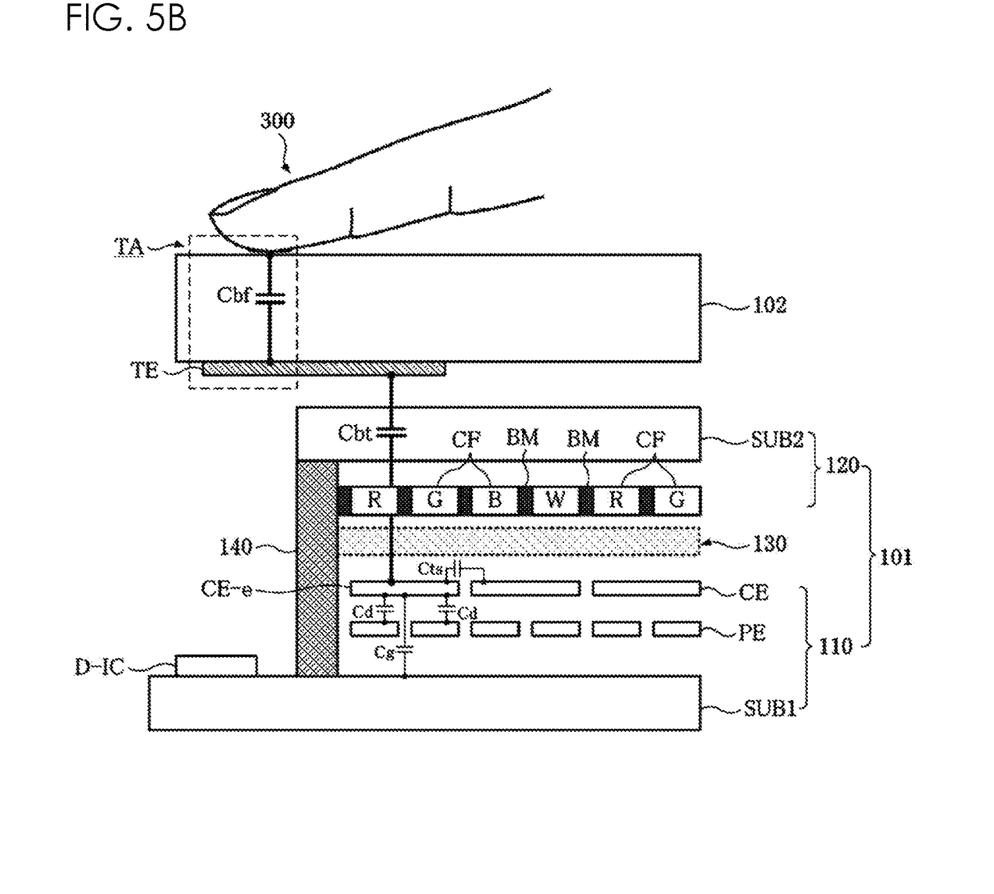
FIG. 5b is a diagram illustrating a case in which touch is applied to the touch key area in the bezel area of FIG. 2.
Figure 6:
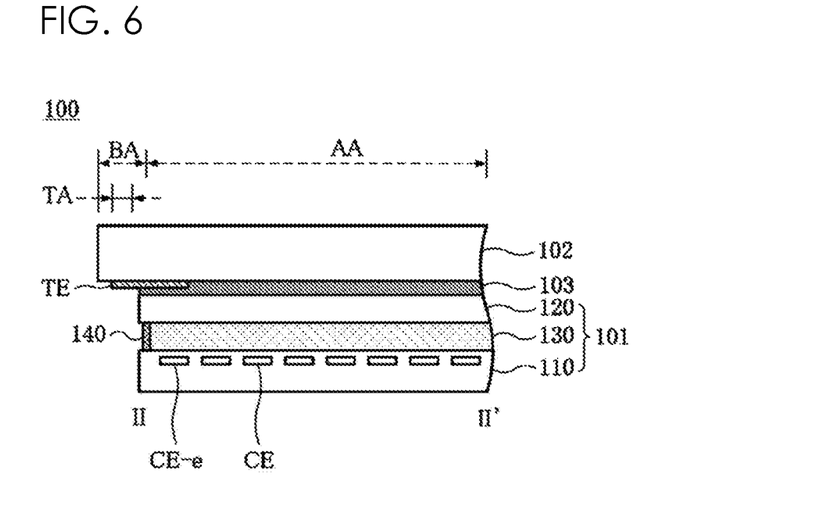
FIG. 6 is a cross-sectional view taken along line II-II' of FIG. 1.
Figure 7A:
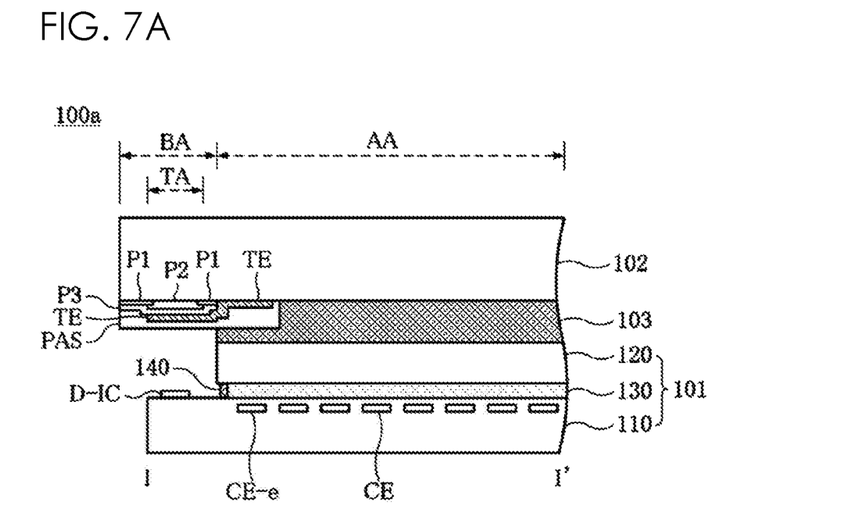
FIGS. 7a and 7b are cross-sectional views showing an in-cell touch display device according to a first example of the present disclosure.
Figure 7B:
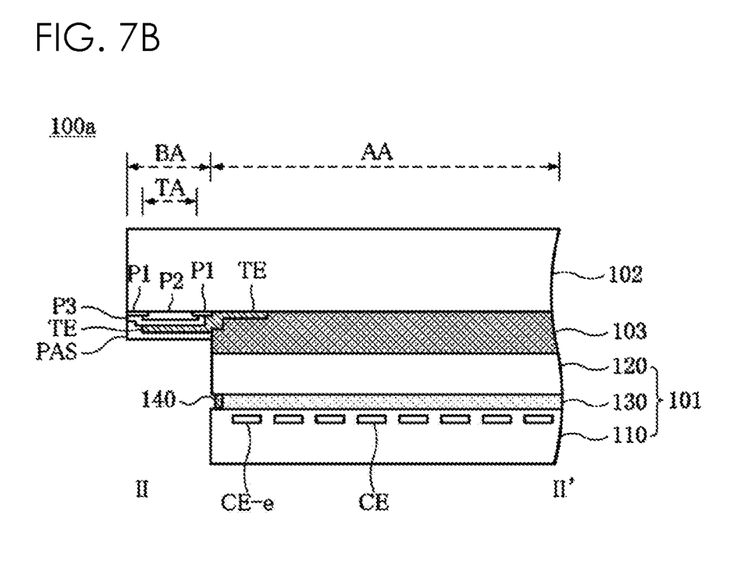
Figure 8A:
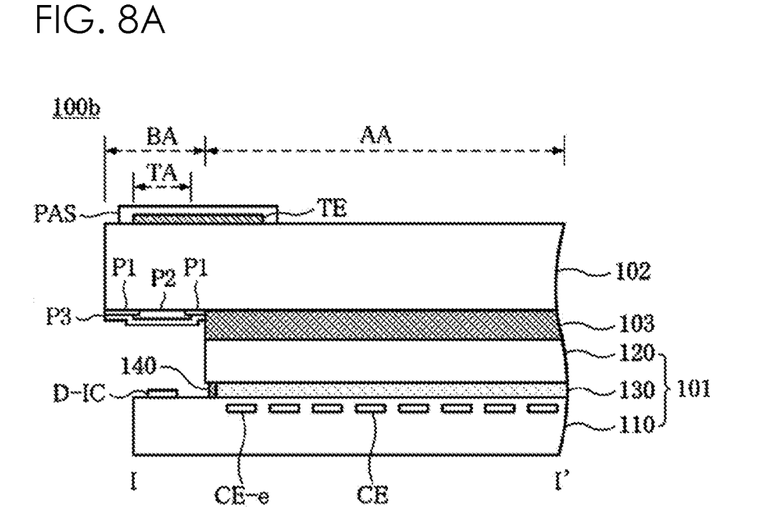
FIGS. 8a and 8b are cross-sectional views showing an in-cell touch display device according to a second example of the present disclosure.
Figure 8B:
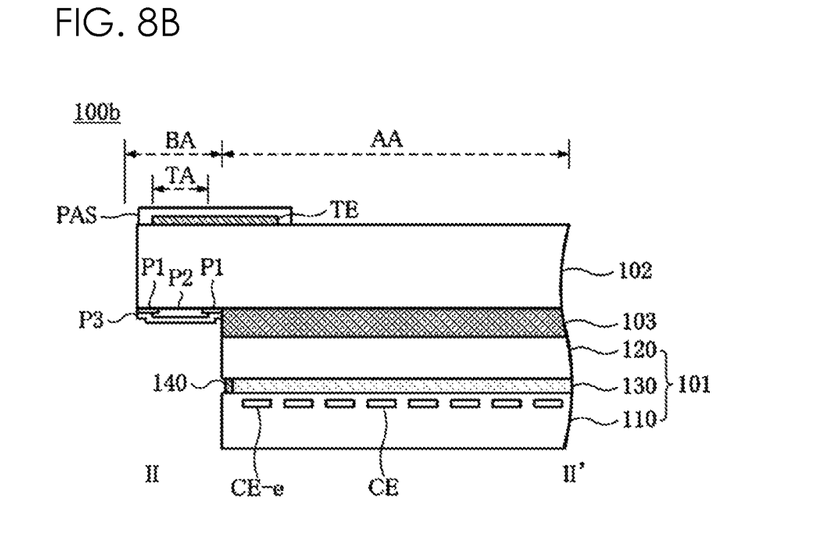
Figure 9:
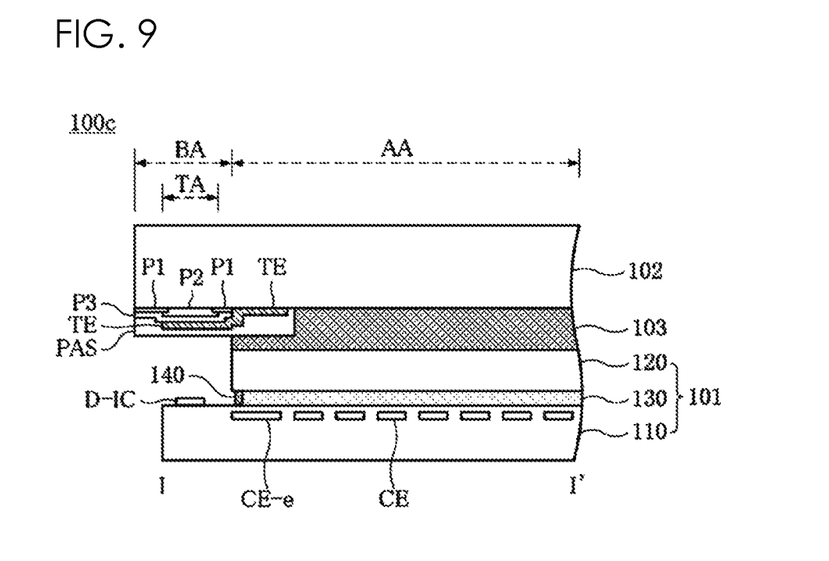
FIG. 9 is a cross-sectional view showing an in-cell touch display device according to a third example of the present disclosure.
Figure 10:
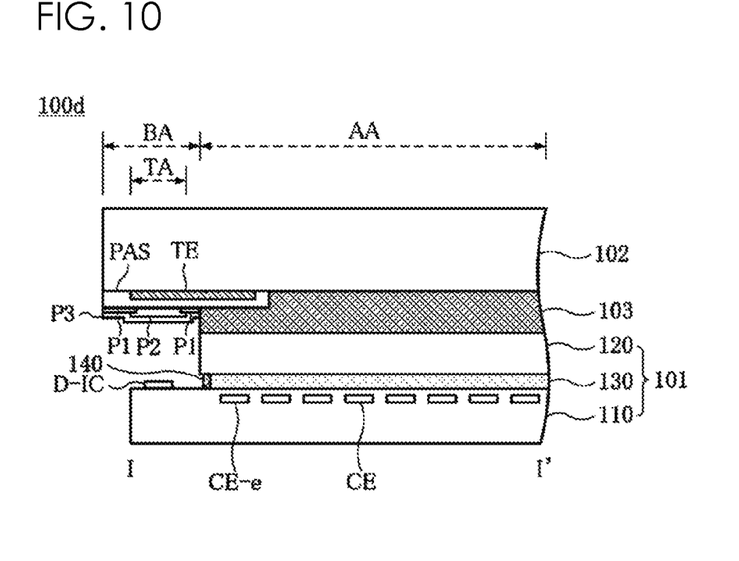
FIG. 10 is a cross-sectional view showing an in-cell touch display device according to a fourth example of the present disclosure.

FIG. 1 is a plan view of an in-cell touch device according to an embodiment of the present disclosure, FIG. 2 is a cross-sectional view taken along line I-I' of FIG. 1 and FIG. 3 is a plan view showing part of a first substrate of FIG. 2. FIG. 4A is a diagram illustrating a case in which touch is not applied to part of a display area of FIG. 2 and FIG. 4B is a diagram illustrating a case in which touch is applied to part of the display area of FIG. 2. FIG. 5A is a diagram illustrating a case in which touch is not applied to a touch key region in a bezel area of FIG. 2 and FIG. 5B is a diagram illustrating a case in which touch is applied to the touch key region in the bezel area of FIG. 2. FIG. 6 is a cross-sectional view taken along line II-II' of FIG. 1 and FIGS. 7A and 7B are cross-sectional views showing an in-cell touch display device according to a first example of the present disclosure. FIGS. 8A and 8B are cross-sectional views showing an in-cell touch display device according to a second example of the present disclosure. FIG. 9 is a cross-sectional view showing an in-cell touch display device according to a third example of the present disclosure and FIG. 10 is a cross-sectional view showing an in-cell touch display device according to a fourth example of the present disclosure.

Referring to FIG. 1, an in-cell touch display device 100 according to an embodiment of the present disclosure includes a display area AA corresponding to a display plane in which images are displayed and a bezel area BA surrounding the display area AA. In addition, the in-cell touch display device 100 includes one or more touch key areas TA separated at intervals and located in the bezel area BA.

When the in-cell touch display device 100 is applied to cellular phones, the in-cell touch display device 100 further includes a speaker area SPEAKER, a label area LABEL and a camera area CAMERA, which are located in the bezel area, separated at intervals and separated from the at least one touch key area TA.

As illustrated in FIG. 1, the speaker area SPEAKER, the label area LABEL and the camera area CAMERA may be provided in a part of the bezel area BA, which corresponds to the upper end of the display area AA, and the at least one touch key area TA may be provided in a part of the bezel area BA, which corresponds to the lower end of the display area AA. The at least one touch key area TA may be further provided in parts of the display area AA, which correspond to at least one of the left and right ends of the display area AA.

Referring to FIG. 2, the in-cell touch display device 100 includes a display panel 101, a cover glass 102 disposed on the display panel 101 and a touch electrode TE corresponding to the touch key area TA and located on the cover glass 102. In addition, the in-cell touch display device 100 may further include an adhesive layer 103 bonding the display panel 101 to the cover glass 102.

The display panel 101 includes a pair of substrates 110 and 120 attached to each other and a light-emitting material or a polarizing material interposed between the substrates 110 and 120.

The display panel 101 may be a liquid crystal display panel including the first substrate 110 including a plurality of thin film transistors, the second substrate 120 including a color filter, a liquid crystal layer 130 formed of a liquid crystal material filled between the first and second substrates 110 and 120, and a sealing layer 140 for sealing the first and second substrates 110 and 120. Here, the sealing layer 140 is provided to the edge of the display area AA.

The first substrate 110 includes gate lines (not shown) and data lines (not shown) located in the display area AA and intersecting with each other to define a plurality of pixel regions, a plurality of thin film transistors (not shown) disposed at intersections of the gate lines and the data lines, a plurality of pixel electrodes (not shown) connected to the thin film transistors, and a plurality of common electrodes CE separated at intervals and insulated from the pixel electrodes (not shown). The pixel electrodes (not shown) respectively correspond to the pixel regions, and each common electrode CE corresponds to two or more neighboring pixel regions.

That is, each common electrode CE corresponds to a touch area, and each common electrode CE corresponds to two or more pixel regions.

A driving integrated circuit D-IC for driving signal lines including the gate lines (not shown) and the data lines (not shown) located in the display area AA may be mounted on the bezel area BA of the first substrate 110.

The touch electrode TE is located on and attached to the cover glass 102. The touch electrode TE corresponds to the touch key area TA extends to the display area AA to overlap with at least one common electrode CE-e in proximity to the bezel area BA.

Accordingly, when touch is applied to the touch key area TA, the effective capacitance seen by the common electrode CE-e via the touch electrode TEchanges and thus the touch applied to the touch key area TA can be sensed.

Specifically, as illustrated in FIG. 3, the first substrate 110 of the display panel 101 includes: gate lines GL and data lines DL located in the display area AA and intersecting each other; a plurality of pixel regions PA defined by the intersecting gate lines GL and data lines DL and located in the display area AA; a plurality of thin film transistors TFT disposed at intersections of the gate lines GL and the data lines DL and respectively corresponding to the pixel regions PA; a plurality of pixel electrodes PE respectively corresponding to the pixel regions PA and individually connected to the thin film transistors TFT; a plurality of common electrodes CE separated at intervals, each of which corresponds to two or more pixel regions PA; and a plurality of touch sensing lines SL individually connected to the common electrodes CE such that there is a single touch sensing line connected to each common electrode CE.

The gate lines GL are connected to a gate driver G-DR, and the gate driver circuit G-DR sequentially provides gate signals to the gate lines GL.

The data lines DL are connected to a data driver D-DR, and the data driver circuit D-DR supplies data signals to the data lines DL.

The gate driver circuit G-DR, which is a relatively simple circuit, may be embedded in the first substrate 110. The data driver circuit D-DR may be a flexible circuit board having the data driving integrated circuit D-IC mounted therein and connected between the first substrate 110 and a main driver or may include the data driving integrated circuit D-IC mounted on the first substrate 110.

The touch sensing lines SL are connected between the common electrodes CE and a touch driver circuit (not shown). Here, the touch driver circuit (not shown) may be provided as part of the data driver circuit D-DR for device integration. The common electrodes CE are used as both display electrodes and in-cell touch electrodes. Through the touch sensing lines SL, a common voltage for image display is applied to the common electrodes CE during a display period. Through the touch sensing lines SL, voltages of the common electrodes CE are delivered to the touch driver circuit (not shown) during a touch sensing period (touch sensing period may also be referred to as a touch driving period). The touch driver circuit (not shown) senses a touch position by detecting whether changes in a voltage of a common electrode CE exceed a threshold. In one embodiment, to sense touch, the touch driver drives a touch driving signal onto the common electrodes through their respective sensing lines, and senses a touch position based on the touch driving signal.

While FIG. 3 illustrates the pixel electrodes PE and the common electrodes CE as having rectangular shapes, this shape is merely one example. In another example the pixel electrodes PE and/or the common electrodes CE may instead be formed in a pattern including at least one slit.

The thin film transistors TFT of the pixel regions PA are turned on by gate signals of the gate lines GL, and data signals of the data lines DL are supplied to the pixel electrodes PE through the turned on transistors TFT.

When the common voltage is applied to the common electrodes CE for a display period and the data signals are supplied to the pixel electrodes PE, a predetermined electric field is generated between the pixel electrodes PE and the common electrodes CE. The electric field rotates liquid crystal molecules in the liquid crystal layer (130 of FIG. 2) to adjust transmissivity of the pixel regions PA.

A touch sensing method in the in-cell touch display device 100 according to an embodiment of the present disclosure will now be described.

Referring to FIGS. 4A and 4B, the first substrate 110 includes a lower substrate SUB1, a plurality of pixel electrodes PE located on the lower substrate SUB1, insulated from the gate lines (GL shown in FIG. 3) and the data lines (DL shown in FIG. 3) and corresponding to a plurality of pixel regions PA. The first substrate 110 also includes common electrodes CE separated from each other at certain intervals. The common electrode CE are located on the pixel electrodes PE and are insulated from the pixel electrodes PE. Each common electrode CE corresponds to two or more pixel regions PA.

For reference, although not illustrated in FIGS. 4A and 4B, the first substrate 110 may further include gate lines (GL shown in FIG. 3), a gate insulating layer (not shown) covering the gate lines GL, data lines (DL shown in FIG. 3) located on the gate insulating layer, a first insulating layer (not shown) covering the data lines DL, and a second insulating layer (not shown) insulating the pixel electrodes PEs from the common electrodes CE. Here, the pixel electrodes PE are located on the first insulating layer and the common electrodes CE are located on the second insulating layer.

The touch sensing lines (SL shown in FIG. 3) may be located on any layer so long as the touch sensing lines are insulated from the gate lines GL and the data lines DL. For example, the touch sensing lines SL may be located on the second insulating layer along with the common electrodes CE.

In addition, the thin film transistors (TFT shown in FIG. 3) may have any of a top gate structure and a bottom gate structure.

Although not illustrated in FIGS. 3, 4A and 4B, when the thin film transistor TFT has the bottom gate structure, the thin film transistor TFT may include a gate electrode formed on the lower substrate SUB1, a semiconductor layer formed on a gate insulating layer, a source electrode and a drain electrode disposed on the gate insulating layer and contacting either sides of the semiconductor layer.

The second substrate 120 includes an upper substrate SUB2, a color filter CF located on one side of the upper substrate SUB2 and emitting lights of colors (red, green, blue and white) R, G, B and W respectively corresponding to the pixel regions PA, and a black matrix BM provided to one side of the upper substrate SUB2 and corresponding to the edge of each pixel region PA. While FIG. 4A illustrates that the color filter CF emits red, green, blue and white light, the color filter CF may alternatively emit red, green and blue light.

The cover glass 102 is provided to the other side of the upper substrate SUB2.

As shown in FIG. 4A, when touch is not applied, the voltage of a common electrode CE is affected by capacitance Cg between the common electrode CE and a corresponding gate line (GL shown in FIG. 3) on the lower substrate SUB 1, capacitance Cd between the common electrode CE and a corresponding pixel electrode PE, and capacitance Cts between the common electrode CE and a neighboring common electrode CE. That is, the voltage of the common electrode CE changes according to a combination of capacitances Cg, Cd and Cts between the gate lines GL and the common electrode CE, between the pixel electrode PE and the common electrode CE and between the neighboring common electrodes CE.

Referring to FIG. 4B, when a predetermined point of the cover glass 102 corresponding to the display area AA is touched by an external element (e.g., a finger) 300, capacitance Cf is generated between the external element (e.g., a finger) 300 and a corresponding common electrode CE. Accordingly, the voltage of the common electrode CE is further affected by the capacitance Cf between the external element 300 generating touch and the common electrode CE.

That is, the voltage of the common electrode CE changes according to a combination of capacitances Cg, Cd, Cts, and Cf, which include the capacitance Cf between the external element 300 and the common electrode CE. Accordingly, the touch position can be recognized by detecting the position at which changes in the voltage of the common electrode CE are greater than a threshold. The changes in the voltage correspond to the capacitance Cf between the external element 300 and the common electrode CE.

Referring to FIG. 5A, when the touch is not applied to the touch key area TA, the voltage of the common electrode CE-e neighboring the bezel area BA and overlapping with the touch electrode TE is affected by a combination of capacitances Cg, Cd, and Cts, which includes capacitances between the common electrode CE-e and a corresponding gate line (GL shown in FIG. 3), between the common electrode CE-e and a corresponding pixel electrode PE and between the common electrode CE-e and a neighboring common electrode CE, like other common electrodes CE in the display area AA. In addition, the voltage of the common electrode CE-e overlapping with the touch electrode TE is further affected by capacitance Cbt between the common electrode CE-e and the touch electrode TE. That is, the voltage of the common electrode CE-e changes according to a combination of capacitances Cg, Cd, Cts, and Cbt, which include capacitances between the common electrode CE-e and the gate line GL, between the common electrode CE-e and the pixel electrode PE, between the common electrode CE-e and the neighboring common electrode CE and between the common electrode CE-e and the touch electrode TE.

Referring to FIG. 5B, when the touch key area TA is touched by the external element 300, capacitance Cbf between the external element 300 and the touch electrode TE is generated. Cbf is in series with Cbt, and thus the effective capacitance seen through Cbt changes. That is, the voltage of the common electrode CE-e overlapping with the touch electrode TE changes according to a combination of capacitances Cg, Cd, Cts, Cbt, and Cbf, which further includes the capacitance Cbf between the external element 300 and the touch electrode TE. Accordingly, it may be possible to recognize whether touch is applied to the touch key area TA by detecting whether changes in the voltage of the common electrode CE-e overlapping with the touch electrode TE are greater than a threshold. The changes in the voltage correspond to a combination of the capacitances Cg, Cd, Cts, Cbt and Cbf.

Although FIGS. 4A to 5B illustrate that common electrode CE is located above the pixel electrode PE, the common electrode CE may be located below the pixel electrode PE, or the common electrode CE and the pixel electrode PE may be located on the same layer.

Now As described above, the in-cell touch display device according to an embodiment of the present disclosure includes the touch electrode TE which corresponds to at least one touch key area TA located in the bezel area BA and extends into the display area to overlap the outermost common electrode CE-e of the display panel 101. Accordingly, when the touch key area TA is touched by the external element 300, capacitance Cbf between the external element 300 and the touch electrode TE changes, and thus the effective capacitance seen through Cbt changes. Therefore, whether the touch key area TA is touched can be sensed through variation in the voltage of the common electrode CE-e.

Since whether the touch key area TA is touched can be sensed using the common electrode CE-e for realizing in-cell touch, there is no need to arrange an additional touch panel and an additional touch driving circuit in the bezel area BA while using part of the bezel area BA as a button key for sensing touch. Accordingly, the width of the bezel area BA can be reduced, the display device 100 can become slimmer and usefulness of the bezel area BA can be enhanced.

FIGS. 2, 5A and 5B illustrate the touch key area TA located in a part of the bezel area BA, which corresponds to the lower end of the display area AA and a region in which the driving integrated circuit D-IC is mounted. However, as described above with reference to FIG. 1, the touch key area TA may be located in a part of the bezel area BA, which corresponds to the left or right end of the display area AA.

Referring to FIG. 6, the touch key area TA may be located in a part of the bezel area BA, which corresponds to the left end of the display area AA. In this case, the touch electrode TE is located on the cover glass 102, corresponding to the touch key area TA, and extends to the display area AA to overlap the at least one common electrode CE-e neighboring the bezel area BA, as in FIGS. 5A and 5B.

In addition, the in-cell touch display device 100 according to an embodiment of the present disclosure may further include first, second and third printed layers P1, P2 and P3 located on the cover glass 102 and corresponding to the bezel area BA and a passivation layer PAS covering the touch electrode TE.

Referring to FIGS. 7A and 7B, an in-cell touch display device 100a according to a first example includes the first printed layer P1 located on the cover glass 102 and corresponding to the bezel area BA, the second printed layer P2 located on the first printed layer P1 and the cover glass 102, the third printed layer P3 disposed on the first and second printed layers P1 and P2, the touch electrode TE positioned on the third printed layer P3, and the passivation layer PAS covering the touch electrode TE.

The first printed layer P1 causes the bezel area BA to have a predetermined color to improve aesthetics of the display device 100a.

The second printed layer P2 corresponds to the touch key area TA and includes printed letters describing the use of the touch key area TA.

The third printed layer P3 is used to make the color of the bezel area BA clear, like the first printed layer P1.

As described above, the in-cell touch display device 100a according to the first example includes the first, second and third printed layers P1, P2 and P3 located on the side of the cover glass 102, facing the display panel 101, the touch electrode TE positioned on the third printed layer P3 and the passivation layer PAS covering the touch electrode TE.

Referring to FIGS. 8A and 8B, an in-cell touch display device 100b according to a second example includes the first, second and third printed layers P1, P2 and P3 located on the side of the cover glass 102, facing the display panel 101, the touch electrode TE positioned on the other side of the cover glass 102 facing away from the display panel, and the passivation layer PAS covering the touch electrode TE. That is, the in-cell touch display device 100b according to the second example is the same as the first example except that the touch electrode TE and the passivation layer PAS are located on the other side of the cover glass 102, which is exposed to the outside.

In this case, the distance between the external element (300 shown in FIG. 5b, e.g., a finger) generating touch applied to the touch key area TA and the touch electrode TE is decreased compared to the first example, and thus touch applied to the touch key area TA may be sensed with higher sensitivity.

Referring to FIG. 9, an in-cell touch display device 100c according to a third second example is the same as the first example illustrated in FIG. 7A except that the common electrode CE-e neighboring the bezel area BA and overlapping the touch electrode TE is extended into the bezel area BA and overlaps the sealing layer 140. In this case, it may be possible to increase the overlapping width of the touch electrode TE and the common electrode CE-e without increasing the width of the bezel area BA, and thus touch applied to the touch key area TA may be sensed with higher sensitivity.

Referring to FIG. 10, an in-cell touch display device 100d according to a fourth example includes the touch electrode TE disposed on one side of the cover glass 102, the passivation layer PAS covering the touch electrode TE, and the first, second and third printed layers P1, P2 and P3 located on the passivation layer PAS. That is, the in-cell touch display device 100d according to the fourth example is the same as the in-cell touch display apparatus 100a according to the first example illustrated in FIG. 7A except that the touch electrode TE and the passivation layer PAS are located between the cover glass 102 and the first printed layer P1 without being disposed on the third printed layer P3.

In this case, the distance between the external element (300 shown in FIG. 5b, e.g., a finger) generating touch applied to the touch key area TA and the touch electrode TE is decreased compared to the first example, and thus touch applied to the touch key area TA can be sensed with higher sensitivity. In addition, the touch electrode TE can be prevented from being damaged because the touch electrode TE is not exposed to the outside.

In one embodiment, the display 100 may be manufactured by forming a cover glass panel from the printed layers P1-P3, touch electrode TE, passivation layer PAS and cover glass 102. This cover glass panel is then attached to the display panel 101 with the adhesive layer 103. In some embodiments, a non-glass cover may be used in place of the cover glass 102.

Those skilled in the art will appreciate that the present disclosure may be carried out in other specific ways than those set forth herein without departing from the spirit and characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A touch display device comprising:
   a display panel including a first substrate and a second substrate attached to each other and opposite each other;
   gate lines and data lines located on the first substrate and intersecting to define a plurality of pixel regions in a display area;
   a plurality of first touch electrodes each corresponding to two or more neighboring pixel regions;
   a plurality of sensing lines connected to the first touch electrodes;
   a cover located on the display panel; and
   at least one second touch electrode on the cover, the at least one second touch electrode corresponding to one or more touch key areas in a bezel area surrounding the display area, touch on said one or more touch key areas being sensed based on a difference between a first signal sensed from a first touch electrode amongst the plurality of first touch electrodes without the touch and a second signal sensed from the first touch electrode amongst the plurality of first touch electrodes in response to the touch.

2. The touch display device according to claim 1, further comprising a driving integrated circuit located in the bezel area on the first substrate and driving the gate lines, the data lines or both the gate lines and the data lines,
   wherein the one or more touch key areas are located in a part of the bezel area corresponding to the driving integrated circuit.

3. The touch display device according to claim 1, wherein the one or more touch key areas are located in a part of the bezel area corresponding to at least one of left and right ends of the display area.

4. The touch display device according to claim 1, wherein the at least one second touch electrode is arranged on a side of the cover facing the display panel.

5. A touch display device comprising:
   a display panel having pixel regions in a display area;
   a plurality of first touch electrodes connected to sensing lines, each first touch electrode corresponding to a respective plurality of the pixel regions in the display area; and
   a second touch electrode corresponding to a touch key area in a bezel area surrounding the display area, touch on said touch key area being sensed based on a difference between a first signal sensed from a first touch electrode amongst the plurality of first touch electrodes without the touch and a second signal sensed from the first touch electrode amongst the plurality of first touch electrodes in response to the touch.

6. The touch display device according to claim 5, further comprising a driving integrated circuit located in the bezel area and driving gate lines, data lines or both the gate lines and the data lines of the display panel,
   wherein the touch key area is located in a part of the bezel area corresponding to the driving integrated circuit.

7. The touch display device according to claim 5, wherein the touch key area is located in a part of the bezel area corresponding to one of left and right ends of the display area.

8. The touch display device according to claim 5, further comprising a cover on the display panel, the second touch electrode located on the cover.

9. The touch display device according to claim 8, wherein the second touch electrode is located on a side of the cover facing the display panel.

* * * * *